United States Patent [19]

Robinson

[11] 4,350,590

[45] Sep. 21, 1982

[54] FILTRATION SYSTEM

[76] Inventor: Norman R. Robinson, 407 E. Edgehill Dr., Davis County, Bountiful, Utah 84010

[21] Appl. No.: 237,937

[22] Filed: Feb. 25, 1981

[51] Int. Cl.³ .......................................... B01D 35/06
[52] U.S. Cl. ................... 210/243; 210/352; 210/492; 204/305
[58] Field of Search ................. 210/243, 350–352, 210/407–409, 441, 457, 488–492; 204/276, 302, 305

[56] References Cited

U.S. PATENT DOCUMENTS

| | | | |
|---|---|---|---|
| 3,252,885 | 5/1966 | Griswold | 210/243 X |
| 3,528,554 | 9/1970 | Ogden et al. | 210/352 X |
| 3,592,766 | 7/1971 | Kudlaty | 210/350 X |
| 3,933,643 | 1/1976 | Colvin et al. | 210/243 |
| 4,238,326 | 12/1980 | Wolf | 210/243 X |

*Primary Examiner*—Thomas G. Wyse
*Attorney, Agent, or Firm*—Terry M. Crellin; B. Deon Criddle

[57] ABSTRACT

A liquid filter system capable of removing particles as small as one micron or less employing a novel electromechanical design in which layers of a fibrous filter media are alternated with electrically conductive porous sheets such as stainless steel screens. The conductive sheets are connected to a source of D.C. electrical power so that the sheets alternate in polarity to establish a uniform electromagnetic field throughout the porous filter media. The filter system is adapted for automatic backwashing cleaning and regeneration. A novel shuttle valve assembly is incorporated in the system for backwash of the filter media. In addition, means are provided for selective compression of the filter media during the filter cycle with decompression and expansion of the filter media being achieved during the backwash cycle.

6 Claims, 4 Drawing Figures

FILTRATION SYSTEM

BACKGROUND OF THE INVENTION

1. Field

The invention relates to fluid filtering systems and, in particular, to systems for filtering material as small as one micron or less from a liquid.

2. State of the Art

Filtering systems for removal of macroscopic sediment and particles from fluids are well known in the art. Self-cleaning filters which utilize programmed backwashing of the filter media have also been proposed. See, for example, U.S. Pat. Nos. 2,632,566; 2,828,017; and 3,388,799. Electrical precipitation of contaminants from gas and liquid streams are known. Only recently however, has it been suggested to utilize an electrical or electromagnetic field in combination with a filter media for removing microscopic contaminants from liquids. Microscopic suspended and dissolved contaminants are effected by the polarization and oxidation of the electrical field to coagulate or coalesce into larger particles which are entrapped and removed from the fluid by the filter media.

3. Objectives

A principal objective of the present invention is to provide an improved filter system which achieves maximum benefits from the electrical mechanical operation of the filter. A further objective is to provide a filter system capable of filtration of particles as small as about 0.2 micron from the fluid being filtered. An additional objective is to provide such a filter system which operates at a high flow capacity and is readily regenerated and self-cleaned by being backwashed. A further objective is to provide a filter system in which the filter media is selectively compressed so as to control its density during the filter cycle, with decompression and expansion of the filter media being achieved during the backwash cycle whereby rapid, efficient regeneration of the filter media is obtained.

BRIEF DESCRIPTION OF THE INVENTION

In accordance with the invention, a filtration system is provided which is capable of filtering particles as small as about 0.2 micron from the fluid being filtered. The filtration system employs a canister or modular filter medium utilizing a unique, novel electro-mechanical design. The filter medium comprises layers of fibrous filter media which are superimposed and alternated with electrically conductive porous sheets, such as stainless steel, so that adjacent layers of the superimposed filter media have an electrically conductive sheet positioned therebetween. Means are provided for connecting a source of direct current voltage to the sheets of conductive, porous material so that the sheets in the composite filter medium alternate in polarity to establish a substantially uniform electromagnetic field throughout the porous filter media.

The filter medium is contained within a housing. In one embodiment of the invention, the housing is cylindrical with perforated side walls. The filter medium is made of superimposed discs of filter media and porous electrically conductive sheets so as to form a generally cylindrical shaped mass which fits into the perforated, cylindrical housing. Distributor means is positioned upwardly through the filter mass so that fluid flows radially outwardly from the distributor means, through the filter mass and from the perforated sides of the housing. The filtered fluid is collected in a chamber positioned around the cylindrical sides of the filter mass.

In another embodiment of the invention, the filter medium is contained within a housing which does not have perforated sides. Flow means are provided so that fluid to be filtered passes through the filter medium linearly, i.e., fluid is introduced to the filter medium through a distributor at one end of the filter medium, flows through the filter medium, and is collected by a header means at the other end of the filter medium.

Irrespective of the flow of fluid through the filter medium, means are provided for selectively compressing the filter media as fluid is being filtered. The compression of the filter media achieves maximum efficiency of contaminant removal. The filter system is adapted for automatic backwash cleaning and regeneration of the filter medium. During backwashing of the filter medium, means are provided for decompressing and expanding the filter media. As the filter media expands, the contaminants collected thereby during the filtration cycle are readily and quickly released and removed from the filter media.

The flow of fluid during the filtration and backwash cycles is controlled by a novel, unique shuttle valve assembly which is capable of instantly and completely reversing the flow of fluid through the filter in the backwash mode. The shuttle valve comprises an elongate tube having a series of ports therein. A series of plug members are spaced along a central shaft within the elongate tube so as to alternately open and close selected ports in the tube as the shaft moves back and forth from first and second positions in the elongate tube. In the first position of the shaft, fluid to be filtered is directed through the filter. In the second position of the shaft, previously filtered water is directed in reverse flow through the filter and then directed to a drain or other disposal means. The complex flow of fluid through the filter system is efficiently controlled in a fool-proof manner by the single movement of the shaft. This eliminates any chance of unfiltered fluid by passing the filter and contaminating previously filtered fluid. In addition, the pump and piping used in the system are not subject to misuse from improper valving sequences.

Additional objects and features of the invention will become apparent from the following detailed description taken together with the accompanying drawings.

THE DRAWINGS

Particular embodiments of the present invention representing the best mode presently contemplated of carrying out the invention is illustrated in the accompanying drawings, in which.

DETAILED DESCRIPTION OF THE ILLUSTRATED EMBODIMENTS

In accordance with the present invention, an improved, unique, novel filtration system is provided which is capable of rendering a filtered fluid effluent having a quality approaching that of reverse osmosis but without the expense of costly, complicated reverse osmosis equipment. The system of the present invention is capable of filtration of contaminants down to a size of about 0.2 microns with most fluids to be filtered. The filtration system provides a novel, uniquely designed filter apparatus which employs an electromagnetic field in combination with the filter media. Flow suspended solids and dissolved microscopic contaminants become electrically polarized and oxidized so as to coalesce or coagulate into particles which are entrapped in the filter media. Charged solids form linear chains and become physically and electrically entrapped within the filter media.

Figure 1:
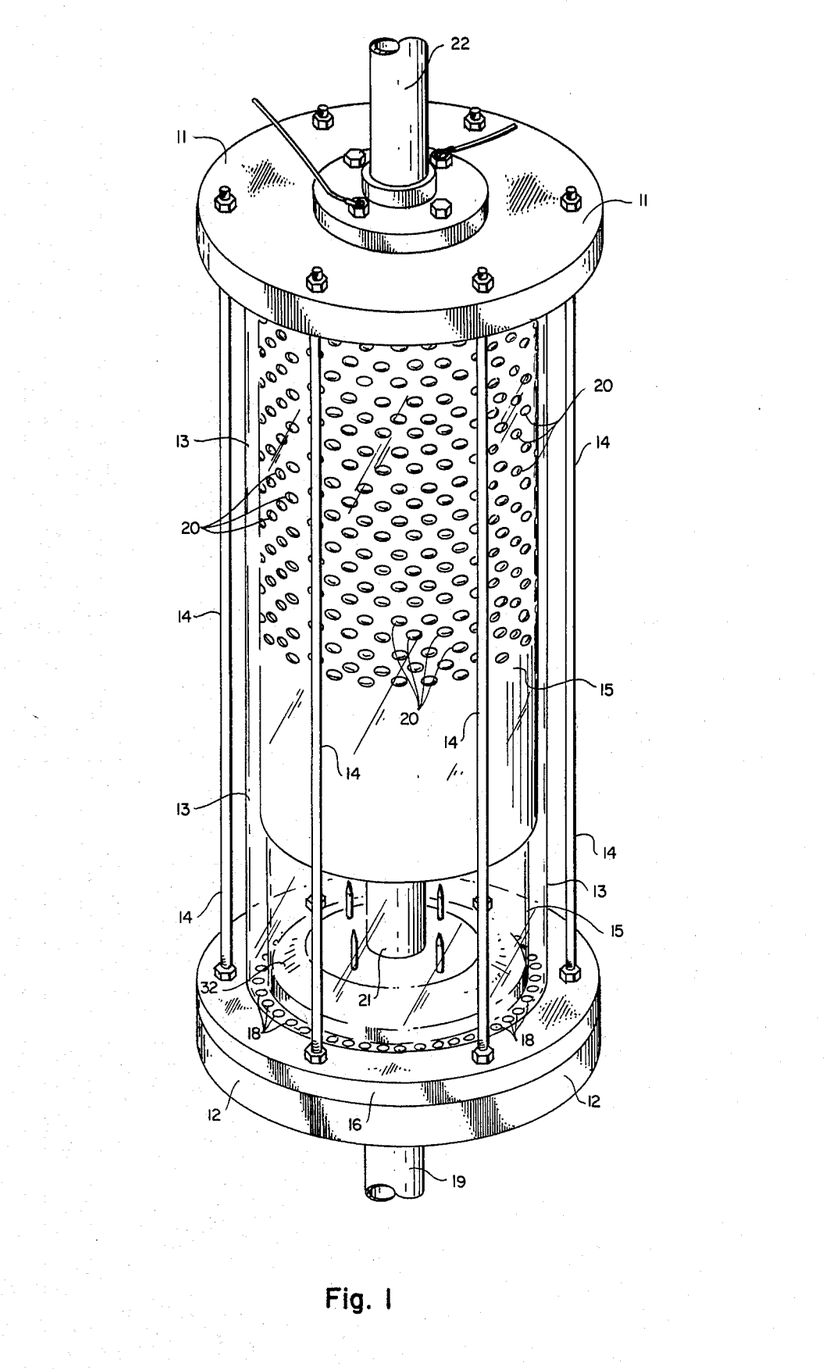
FIG. 1 is a pictorial view of a filter module or canister in accordance with the present invention.
Figure 2:
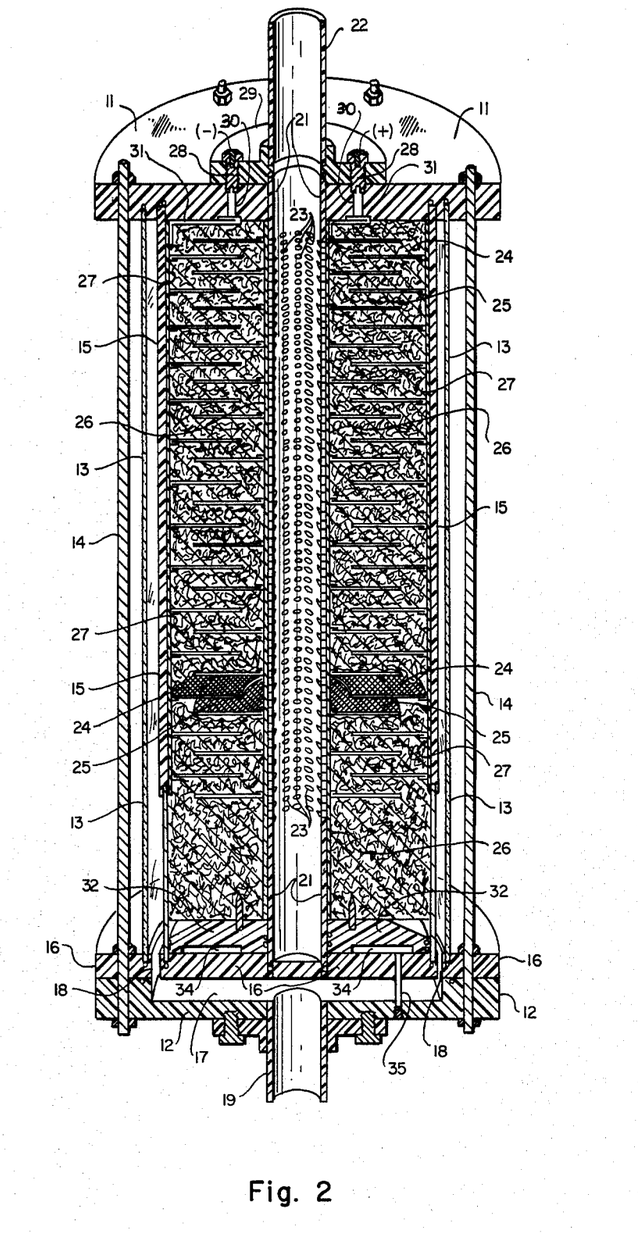
FIG. 2 is a pictorial cross-sectional view through the device of FIG. 1.

As illustrated in FIGS. 1 and 2, the filter apparatus has a cylindrical shape and comprises end flanges 11 and 12. A cylindrical housing member 13 is held between the end flanges 11 and 12 by threaded and bolted rods 14. The housing 13 is conveniently made of clear acrylic or methacrylate plastic so that the filter operation can be viewed through the clear housing 13. The opposite ends of the housing 13 are compression fit into recesses in the flanges 11 and a disc member 16 respectively to form a liquid tight seal.

An inner cylindrical sleeve 15 is positioned coaxially within the housing 13. The upper end of the sleeve 15 is compression fit into a recess in the upper flange 11. The lower end of the sleeve 15 is compression fit into a recess in a disc member 16 which seals the lower end of the sleeve 15 liquid tight. The disc member 16 fits tightly against the upper surface of the lower flange 12 by the threaded rods 14 which have bolts thereon holding the flange 12 and disc member 16 together. The upper side of the flange 12 has a disc-like recess therein which has a diameter slightly larger than the diameter of the inner cylindrical sleeve 15 such that a disc shaped chamber 17 is formed by the recess with the disc member 16 closing the top of the chamber 17. A plurality of openings 18 (FIG. 2) are provided in the disc member 16 so as to provide flow communication paths between the chamber 17 and the annular space between the housing 13 and inner sleeve 15. A nipple 19 is provided in the flange 12 for flow communication from a pipe to the chamber 17. During filtration, fluid enters the chamber 17 from the nipple 19 and flows through the openings 18 to the annular space between the housing 13 and inner sleeve 15. During backwash, which will be more fully described hereinafter, the flow of fluid is opposite, i.e., from the annular chamber through the slots 18 to the chamber 17 and then out through the nipple 19.

The inner cylindrical sleeve 15 has a plurality of openings 20 around at least the upper half of the sleeve 15. The openings 20 form a flow path for fluid from the annular space between the housing 13 and the space within the inner cylindrical sleeve 15. As illustrated, the inner sleeve 15 is advantageously made of two sections which are joined end to end. The upper section of sleeve 15 may have a thicker side wall thickness than the lower section. This is to provide strength for the upper section which contains the plurality of openings 20. The lower section of the sleeve 15 is advantageously made of transparent plastic such as acrylic or methacrylate. The transparent nature of the lower section of the sleeve 15 allows visual observation of the lower portion of the filter media which will be described hereinafter. Such observation of the filter media will give indication of the condition of the filter, and, as will be explained hereinafter, whether additional filter media should be added to the filter.

An elongate tube 21 is positioned along the axis of the inner sleeve 15, with the upper end of the tube 21 extending through an opening in the upper flange 11. A nipple 22 is provided in flow communication with the upper end of tube 21, with a reinforcement ring 29 bonded to the nipple 22 and the upper flange 11 of the filter apparatus. A plurality of openings 23 are provided in the tube 21. The total open area formed by the openings 23 in the tube 21 should be substantially the same as the total open area formed by the openings 20 in the inner sleeve 15 inasmuch as fluid flow through the chamber formed within sleeve 15 will flow in and out of the openings 20 and 23 during operation of the filter, and the resistance to fluid flow of one set of openings should be substantially equal for optimum operation of the filter. The actual number of openings 20 and 23 are such that the resistance to flow created by such openings is as small as possible relative to the resistance to flow through the filter media.

The lower end of the tube 21 is received in a circular recess in the disc member 16 so as to form a fluid tight seal at that end. During filtration, fluid flows into the chamber within the inner sleeve through the openings 20 therein and then flows from the chamber in the inner sleeve through the openings 23 in the tube 21. From the tube 21, the fluid flows out of the filter through nipple 22. Thus during filtration, fluid flows into the filter apparatus through nipple 19 and out of the filter apparatus through nipple 22. During backwash of the filter, the fluid flow is just opposite, i.e., into the filter apparatus through nipple 22 and out of the filter apparatus through nipple 19.

The filter media is contained in the chamber formed within the inner sleeve 15. The filter media can be any fibrous filter material known in the art. Preferably, the filter media is made of a fibrous wool material. The fibrous wool can be formed from rock, slag or glass wool. Preferably, the fibrous wool is formed from polyester, nylon, or a mixture of polyester and nylon. The fibrous wool filter media is resilient and hence has a certain compressable property which is utilized as explained hereinafter. The filter media is formed into disc shaped pieces having a center hole of the same diameter as the diameter of tube 21 of the filter apparatus. The outer diameter of the discs of filter media is the same as the inside diameter of the inner sleeve 15 of the filter apparatus. The discs of filter media are loaded into the inner sleeve 15 of the filter apparatus in alternating layers with porous electrode members 24 and 25. The porous electrode members 24 and 25 are made of porous sheets of material such as stainless steel screen, or a cloth material having stainless steel threads woven into the cloth.

The porous electrode members 24 and 25 alternate between discs of the filter media as best shown in FIG. 2. The electrode members 24 have a disc shape with an outside diameter at least that of the diameter of the inner sleeve 15. A hole is formed in the center of the electrode members 24, with such holes having a diameter greater than the diameter of tube 21. The electrode members 25 have a disc shape with an outside diameter which is smaller than the diameter of the inner sleeve 15. A hole is formed in the center of the electrode members 25, with such holes having a diameter no greater than the diameter of tube 21. In forming the filter media in the inner sleeve 15, a disc of filter media is inserted from the bottom of the inner sleeve 15 when the flange 21 and disc member 16 have been removed from the apparatus. The disc of filter media is pushed to the top of the inner sleeve 15 and one of the electrode members 24 or 25 is then inserted into the sleeve member 15 and pushed upwardly into contact with the previously inserted disc of filter media. As illustrated, electrode member 25 is shown as the initial electrode member positioned in contact with the initial disc of filter medium. After the insertion of the electrode member 25, another disc of filter media is inserted into the inner sleeve 15 and pushed upwardly into contact with the previously inserted electrode member. Then an electrode member 24 is inserted into the inner sleeve and pushed upwardly into contact with the previously inserted disc of filter media. This process is repeated with an electrode member being inserted between each of the discs of filter material and with the electrode members 24 and 25 also being alternated so that the alternating interfaces between the disc of filter material have an electrode member 24 thereat with the interfaces inbetween having an electrode member 25 thereat. In other words, the basic repeating unit of the filter medium comprises a disc of filter media, an electrode member 25, another disc of filter media and an electrode member 24. These units are repeated until the space in the inner cylindrical sleeve 15 is filled to a desired capacity.

A cylindrical, stainless steel screen 26 having a diameter so as to fit snugly over the central tube 21 is positioned around the tube 21 so that the circular edge of the hole in the electrode members 25 contact the screen as the electrode members 25 are positioned in place in the filter medium. A second cylindrical stainless steel screen 27 is provided adjacent the inside surface of the inner cylindrical sleeve 15. The second stainless steel screen 27 has a diameter substantially that of the inside diameter of the inner sleeve 15, so that the outer circular edge of the electrode members 24 contact the screen as the electrode members 24 are positioned in place in the filter medium. As shown, it has been found preferable to form the circular hole in the electrode members 25 with a diameter somewhat smaller than the diameter of the cylindrical screen 26. The portions of the electrode members 25 adjacent to the holes are folded back over themselves so as to be able to fit over the cylindrical screen 26. The biasing of the material which is folded back produces good, sliding contact with the cylindrical screen 26 as the electrode members 25 move, as will be described hereinafter, relative to the screen 26. Likewise, the outer diameter of the electrode members 24 is preferably greater than the diameter of the cylindrical screen 27. Circumferential portions of electrode members 24 are folded back over themselves so as to be able to fit within the cylindrical screen 27. The biasing of the material which is folded back produces good sliding contact with the cylindrical screen 27 as the electrode members 24 move, as will be described hereinafter relative to the screen 27.

Means are provided for applying a direct current voltage differential across the cylindrical screens 26 and 27. That is, either of the cylindrical screens 26 and 27 is maintained at a substantially constant, positive voltage relative to the other. As illustrated, electrical contacts are made to a pair of bolts 28 which secure a support ring 29 to the upper flange. Electrical connecting pins 30 extend from the bolts 28 to electrical conductors 31 which, in turn, are connected to the cylindrical screens 26 and 27, respectively. As illustrated, the more negative voltage is connected to the screen 27 so that the electrode members 24 are negatively charged with respect to electrode members 25. The electrode members 25 make contact with screen 26 which in turn is connected to the positive voltage.

Means are provided for compressing the filter medium during the filtration cycle and for expanding the filter medium during backwash of the filter. In the embodiment of the filter shown in FIGS. 1 and 2, a compression plug 32 has a central opening therein and is adapted to slide over the elongate tube 21 in the center of the filter apparatus. Sealing means, such as o-rings, are provided to make a sliding seal between the central opening in the plug member 32 and the tube 21. The plug member is disc shaped, with its outer diameter being such as to slidingly fit within the inner cylindrical sleeve 15. Sealing means, such as o-rings, are provided to make sliding seal between the circumference of the plug member 32 and the inner sidewall of the cylindrical sleeve 15. The bottom face of the disc shaped plug 32 has a recessed torus machined therein so that when the plug member 32 is in its position adjacent to the disc member 16, a circular chamber 34 is formed between the plug member 32 and the disc member 16. A conduit means 35 extends through the lower end flange 12 and disc member 16 to communicate with the chamber 34. The conduit means 35 may be a tube extending through a bore in the disc member and then downwardly therefrom, with the downwardly extending end of the tube being removably sealed in a bore in the lower flange 12. The bore in the lower flange 12 is in turn adapted to have an external tube or other source of pressurized fluid attached thereto.

As a pressurized fluid is introduced to the chamber 34 through the conduit means 35, a force is exerted in the disc-shaped plug member 32 biasing the plug member 32 to move upwardly and thus compress the filter media. During backwash of the filter media, the pressurized fluid is withdrawn through the conduit means 35, and the pressure of the backwash fluid in the filter in the filter media expands the filter media and moves the plug member 32 downwardly. An advantageous feature of the plug member 32 is that it has a chamber perimeter, with the outer portion of the face of the plug member 32 facing the filter media being tapered away from the filter media. The purpose of the tapered outer periphery of the plug member 32 is to concentrate the compression of the filter media to the inner portion thereof adjacent to the tube 21. This leaves the outer peripheral portion of the cylinder of filter media less compressed and better able to entrap solids and particles from the liquid which is being filtered and to release the particles and solids during backwash of the filter media.

As mentioned above, during backwash of the filter media, the disc-shaped plug member 32 moves downwardly to its fully extended position abutting the disc member 16, and the filter media is expanded so as to aid the backflush of fluid in cleaning in the removal of entrapped contaminants from the filter media. In the backflush operation, previously filtered fluid is pumped through the filter media in the reverse direction of the flow during the filtration cycle. The electrode members 24 and 25 are disconnected from the electrical supply voltage during the backwash so as to remove the electromagnetic field and release the coalesced or coagulated particulate material to be flushed out of the filter media. The expansion of the filter media as explained above makes the filter media more porous. The combined effect of the reverse fluid flow, the removal of the electromagnetic field and the expansion or increased poracity of the filter media results in a very high degree of contaminant removal from the filter media during backwash in a short time.

The transparent nature of the outer housing 13 of the filter and the lower portion of the inner cylindrical sleeve 15 is advantageous in visual monitoring of the condition of the filter media. During backwash, the filter media expands into the lower, transparent portion of the inner cylindrical sleeve 15, and the condition of the filter media can be observed. If replacement of the filter media is necessary, the lower flange 12 and its associated disc member 16 are removed. The disc-shaped plug member 32 is then pulled from the end of the inner cylindrical sleeve to expose the filter media. The old filter media is then removed and replaced with new filter media.

As is evident from the above discussion of the compaction and expansion action on the filter media during filtration and backwash, the electrode members 24 and 25 must move with the filter media as the media is compressed and expanded. The movement of the electrode members 24 and 25 require that appropriate means be provided for establishing electrical contact to the electrode members. AS illustrated electrode members 24 made sliding electrical contact with the outer cylindrical screen 27 and the electrode members 25 made sliding electrical contact with the inner cylindrical screen 26. It has been found that completely adequate electrical contact can be provided by simply designing the electrode members such that the edges thereof are turned back over themselves as explained hereinabove to make contact with the respective cylindrical screens 26 and 27. As the filter media is compressed and expanded, the electrode members 24 and 25 move back and forth in sliding electrical contact with the respective cylindrical sleeves 27 and 26.

Figure 4:
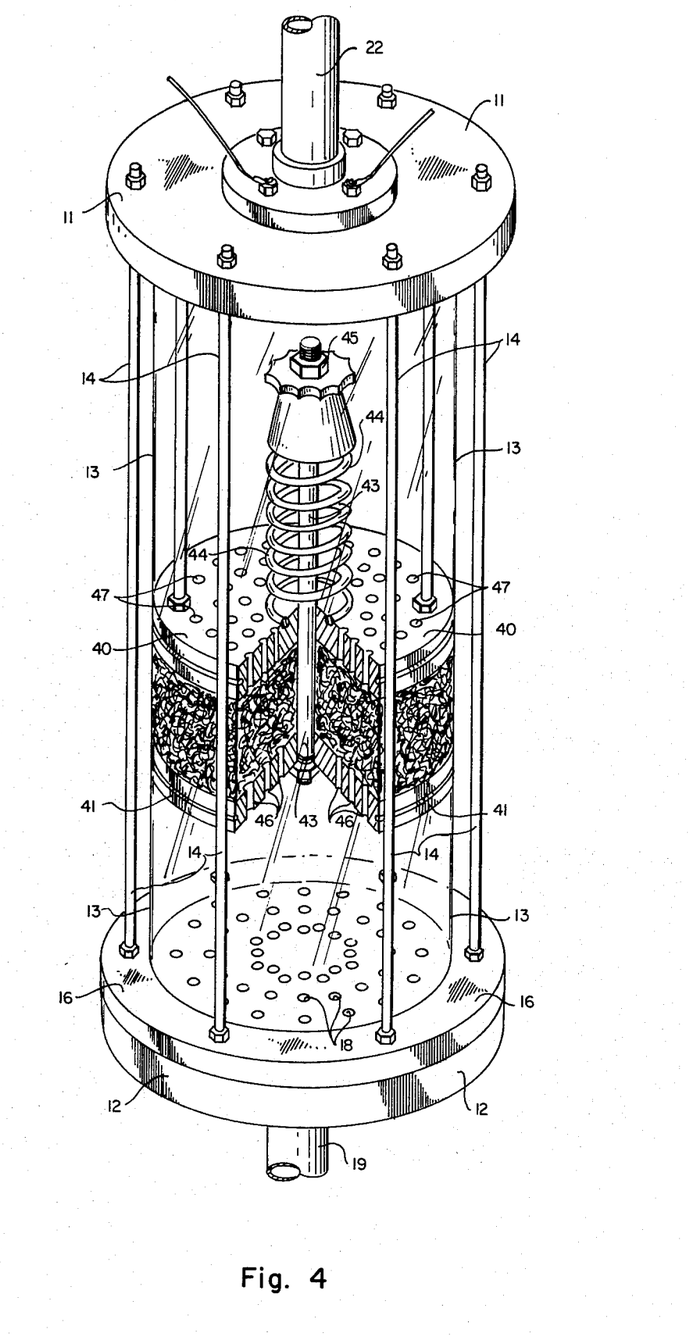
FIG. 4 is a pictorial view of another embodiment of a filter module or canister in accordance with the present invention showing a portion of the filter medium broken away for clarity.

An alternative, preferred embodiment of the filter apparatus in accordance with the present invention is illustrated in FIG. 4. The flow of fluid in the apparatus of FIG. 4 is longitudinal through the filter media rather than radial as in the apparatus shown in FIGS. 1 and 2. The apparatus of FIG. 4 has end flanges 11 and 12, with a transparent or clear housing 13 positioned between the end flanges with rods 14 in the same manner as described above with respect to the apparatus shown in FIGS. 1 and 2.

The lower flange 12 is the same as illustrated in FIGS. 1 and 2, and the disc member 16 is also essentially the same. The only difference being that there is a plurality of openings 18 throughout the disc member 16 and there is no conduit means 35 associated therewith. During filtration fluid flows into the filter apparatus through nipple 19 and into a distribution chamber formed between the flange 12 and disc 16 in the same manner as described with respect to the apparatus of FIGS. 1 and 2. The fluid then flows through the openings 18 into the transparent housing 13. The fluid flows upwardly through the housing 13 and the filter media and exits the filter through nipple 22 in the top end flange 11. During backwash, the flow of fluid is reversed.

The filter media of the embodiment of the apparatus shown in FIG. 4 is held between upper and lower containment discs, respectively. The containment discs 40 and 41 are adapted to fit snugly within the clear, cylindrical housing 13. Means for making a sliding seal between the perimeters of the containment discs 40 and 41 are provided. As shown, O-rings are positioned around the perimeters of the discs and make sliding contact with the inner sidewall of the housing 13. Means are provided for securing the upper containment disc 40 in a fixed position within the housing 13. As shown, rods 42 extend from the top flange 11 to the upper containment disc 40 and secure the upper containment disc 40 in a fixed, nonmovable position.

The lower containment disc 41 is mounted so as to be movable in the longitudinal direction of the housing 13. Means can be provided for biasing the lower containment disc 41 towards the upper disc 40. As illustrated, a bolt 43 extends from the lower disc 41 through a central bore in the upper disc 40 and then through a coil spring 44 which is positioned in contact with the upper surface of the disc 40. Tension on the spring 44 can be adjusted with the nut 45 and associated adjustment knob on the bolt 43. By increasing the tension of spring 44, the biasing force on the lower disc 41 is increased, and vice versa.

A plurality of openings 46 and 47 are uniformly provided in the lower and upper containment discs 41 and 40, respectively. The total open area provided by the openings 46 in the lower disc 46 is smaller than the total area provided by the openings 47 in the upper disc 47. Thus, when fluid is flowing through the housing 13 in a direction from the lower disc 41 through the filter media to the upper disc 40, the pressure exerted on the face of the lower disc 41 by the flowing fluid is greater than the pressure exerted by the fluid on the face of the upper disc. Thus, the lower disc 41 is biased to compress the filter media during filtration by a combined force exerted thereon by the spring 44 and the pressure of the fluid flowing through the filter. During backwash, i.e., fluid flowing in the direction from the upper disc 40 through the filter media to the lower disc 41, the pressure exerted by the flowing fluid is again greater on the lower disc 41 than on the upper disc 40. However, during backwash, the pressure exerted on the lower disc 41 exerts a force thereon which counteracts the biasing force of the spring. By proper adjustment of the spring tension, any particular degree of expansion of the filter media during the backwash cycle can be achieved. The spring means 44 and bolt 43 can, in fact, be eliminated completely. When such is done, the biasing force exerted on the lower disc 41 results exclusively from the pressures exerted thereon by the fluid flowing through the filter.

Although not specifically illustrated in FIG. 4, the filter media used in the filter is preferably formed in the same manner as described for the apparatus shown in FIGS. 1 and 2. That is, the filter medium comprises discs of filter media which alternate with porous electrode members. Means not shown in FIG. 4 but similar to that shown in FIGS. 1 and 2 are preferably provided for electrically charging the electrode members to establish an electromagnetic field in the filter medium as described above with respect to the apparatus of FIGS. 1 and 2. The filter media is shown in FIG. 4 for illustrative purposes only, and it should be recognized that the amount of filter media contained between the upper and lower discs 40 and 41 can vary from a relatively thin bed as shown in FIG. 4 to a thicker bed which fills essentially the whole space within the housing 13 below the upper disc 40. Preferably, some free space is provided between the disc 41 and the disc member 16 associated with the lower flange 12 so that the filter media can be expanded during backwash as explained above.

Figure 3:
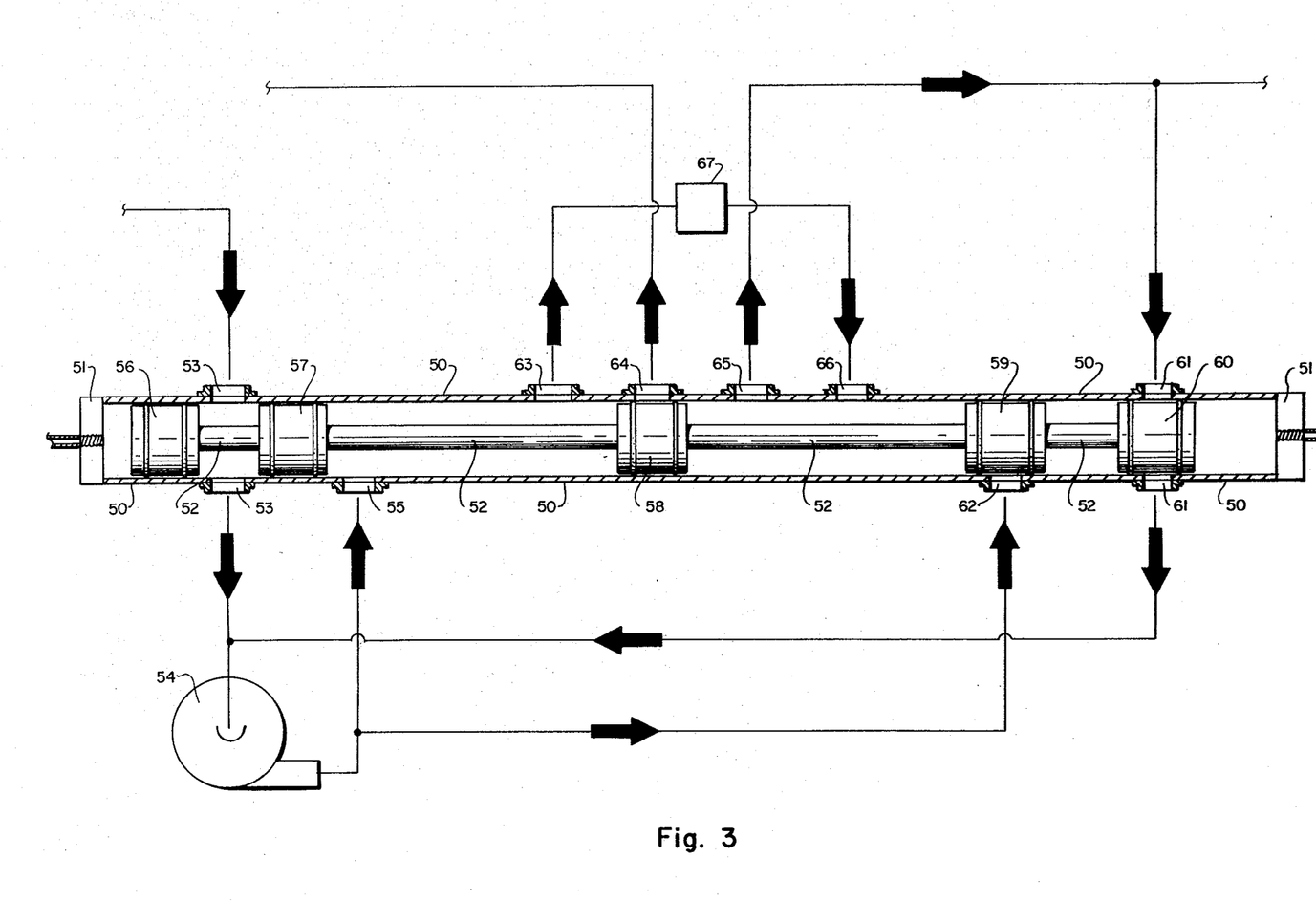
FIG. 3 is a diagramatic cross-sectional view of a shuttle valve and a schematic diagram of the pump and piping used in the filter system of the present invention.

The filter apparatus of FIGS. 1, 2 and 4 is advantageously operated in a system shown schematically in FIG. 3. The system utilizes a particular valving system which by the movement of one integral shuttle mechanism reverses flow through the filter apparatus and prevents any chance of bypass of unfiltered fluid to the filtered side of the filter apparatus. When the shuttle mechanism reverses the flow through the filter, the backwash fluid is automatically diverted to a drain or other disposal means.

As shown in FIG. 3, the shuttle valve comprises an elongate section of pipe or tubing 50. Preferably the tubing 50 is made of polyvinyl chloride, chlorinated polyvinyl chloride, or other polymeric material which is inert to the fluid which is to be filtered. The tubing is provided with ports positioned along the length of the tubing and the ports are provided with flanges which are adapted to be connected to the piping of the filter system. The opposite ends of the tubing 50 are sealed by removable plug members 51. The plug members 51 are bored and tapped so that a source of fluid under pressure can be attached thereto to feed the fluid under pressure into the tubing 50. A longitudinal shuttle is positioned axially within the tubing 50. The shuttle comprises cylindrical sections which fit snugly within the tubing 50, with the cylindrical sections being held in spaced apart positions by rods or pipe sections 52. The cylindrical sections and the rods or pipe sections 52 are preferably made of the same polymeric material as the tubing 50. The cylindrical sections are provided with o-rings near their opposite ends so that the o-rings make a sliding seal with the internal surface of the tubing 50. The shuttle mechanism comprising the cylindrical sections and the spacers 52 is adapted to move back and forth within the tubing. As a fluid under pressure is admitted through the tapped connection in the plug member 51 at the left end of the tubing 50, the shuttle mechanism will move to the right a distance of about the length of one of the cylindrical sections of the shuttle mechanism. To move the shuttle mechanism back to its original position, the fluid is released from the tapped connection in the plug at the left end of the tubing 50 and fluid under pressure is admitted through the tapped connection in the plug member 51 at the other end of the tubing 50. Thus, the shuttle mechanism can be moved back and forth between two positions within the tubing 50.

As illustrated, suction of fluid to be filtered is through two radially aligned ports 53. With the shuttle mechanism in its position as shown in FIG. 4, with the shuttle moved towards the left end of the tubing 50, the end cylindrical section 56 and the next adjacent cylindrical section 57 at the left of the shuttle mechanism are positioned so that a flow channel is created between the spaced apart cylindrical sections 56 and 57 and sealed from flow along the length of the tubing 50. The fluid flows through the aligned ports 53 to the suction of a pump 54. The delivery of pressure side of the pump 54 has a header pipe system with delivery to two spaced apart ports 55 and 62 in the tubing 50. The first port 55 is spaced adjacent to the second cylindrical section 57 from the left end of the shuttle mechanism so that when the shuttle mechanism is in its far left position, port 55 is open but when the shuttle mechanism is moved to its far right position, the port 55 is blocked shut by the cylindrical section 57. The second port 62 in the pump header pipe system is located down the tubing 50 next to two radially aligned ports 61 near the right end of the tubing 50. A cylindrical section 59 in the right end portion of the shuttle mechanism is adapted to block port 62 when the shuttle mechanism is in its far left position. When the shuttle mechanism is moved to the right, port 62 is open and in communication with the central portion of the tubing 50.

A series of four ports 63, 64, 65 and 66 are positioned equally spaced along the tubing near the central portion thereof. A cylindrical section 58 in the central portion of the shuttle mechanism is adapted to block port 64 when the shuttle mechanism is in its far left position and to block port 65 when the shuttle mechanism is moved to its far right position. During the filtration cycle, the shuttle mechanism is in its far left position and fluid flows from the pump 54 through ports 55 and 63 to the filter apparatus which is shown schematically as box 67 in FIG. 3. From the filter apparatus, the fluid flows to port 66 then through port 65 to the filtered fluid header line which delivers the filtered fluid to its desired destination.

During backwash of the filter apparatus, the shuttle mechanism is moved to its far right position. Cylindrical section 56 blocks the aligned ports 53 in the contaminated fluid, suction line. In turn, cylindrical section 59 and 60 move to their right so as to create a flow channel therebetween which connects the aligned ports 61 in the right hand end section of the tubing 50. As can be seen the ports 61 then allow previously filtered fluids to be drawn into the suction of the pump 54. The filtered fluid is then delivered by the pump 54 to port 62 inasmuch as port 62 is opened and port 55 is closed when the shuttle mechanism moves to the right. Also, port 65 becomes blocked by cylindrical section 58 as the shuttle mechanism moves to the right and port 64 is opened. The filtered fluid from pump 54 flows through ports 62 and 66 and then in reverse flow through the filter apparatus down diagramatically as box 67 in FIG. 3. From the filter apparatus, the backwash fluid flows through ports 63 and 64 to a waste drain pipe or conduit. As can be seen, the reverse flow or backwash of the filter is achieved with a simple movement of the integral shuttle valve. Cross flows between unfiltered and filtered fluid and dead heading of the pump 54, which can cause damage to the pump and associated piping, are not possible.

Although several preferred embodiments of the apparatus have been illustrated, it is to be understood that the present disclosure is made by way of example and that various other embodiments are possible without departing from the subject matter coming within the scope of the following claims, which subject matter is regarded as the invention.

I claim:

1. Filter apparatus capable of removing particles as small as one micron or less from a liquid passing through the filter, said apparatus comprising
   a plurality of superimposed layers of fibrous filter media;
   a plurality of electrically conductive porous sheets with the electrically conductive porous sheets alternating with the layers of fibrous filter media so that adjacent layers of the superimposed filter media have an electrically conductive porous sheet positioned therebetween;

means for connecting a source of direct current voltage to the electrically conductive porous sheets so that the sheets in the superimposed filter media alternate in polarity;

means for directing a flow of liquid to be filtered through the superimposed filter media;

means for directing a flow of backwash fluid through the superimposed filter media in reverse flow to backwash the filter media;

means for selectively compressing the filter media as the flow of liquid to be filtered passes through the filter media; and means for decompressing and expanding the filter media as the flow of backwash fluid passes through the filter media during backwash of the filter.

2. Filter apparatus as claimed in claim 1, wherein:

The fibrous filter media is contained within an enclosure, said enclosure having outer peripheral walls, top and bottom ends, and a centrally located flow tube extending from one end of said enclosure to and through the other end of said enclosure;

a plurality of openings are provided in the outer peripheral walls and in the centrally located flow tube;

a manifold is provided enclosing the outer surface of the outer peripheral walls;

means are associated with said central flow tube and said manifold whereby fluid to be filtered, passes through the filter media between said manifold and said central tube in one direction as liquid is being filtered and backwash fluid flows through the filter media in the opposite direction as the filter media is being backwashed;

plug means at one end of said enclosure having a central opening therein so as to be adapted to slide over the elongate tube, said plug means having sealing means to make a sliding seal between the perimeter of the plug member and the inner side walls of said enclosure;

means for applying a hydraulic fluid under pressure to the space between said plug means and the mutually respective end of said enclosure when a fluid to be filtered is passed through said filter media so that the plug means pushes against and compresses said filter media; and means for releasing said hydraulic fluid from said space between said plug member and the mutually respective end of said enclosure when backwash fluid flows through the filter media, whereby the pressure of the backwash fluid pushes said plug member away from the filter media to decompress and expand the filter media.

3. Filter apparatus as claimed in claim 2, wherein the outer portion of the face of said plug means facing the filter media is chamfered and tapered away from the filter media.

4. Filter apparatus as claimed in claim 1, wherein:

the fibrous filter media is contained within an enclosure, said enclosure having outer peripheral walls and top and bottom ends;

means for introducing fluid to be filtered through one of the ends of said enclosure and of removing filtered water from the other end of said enclosure;

means for introducing a backwash fluid during backwash of the filter apparatus to said other end of said enclosure and removing backwash fluid from said one end of said enclosure;

a pair of spaced containment discs positioned in said enclosure so that said filter media is contained within said enclosure and between said containment discs;

means for providing one of said containment discs in a fixed position within said enclosure;

means for mounting the other of said containment discs within said enclosure so that said other containment disc is movable within said enclosure towards and away from said one containment disc;

a plurality of openings in both of said containment discs, with the openings in said one containment disc having a total open area greater than the total open area of the openings in said other containment disc, whereby the fluid pressure exerted on said other containment disc is greater than the pressure on said one containment disc when a fluid to be filtered is passed through said filter media so as to compress the filter media, and whereby the fluid pressure exerted on said other containment disc is also greater than the pressure on said one containment disc when a backwash fluid is passed through said filter media so as to decompress and expand the filter media.

5. Filter apparatus as claimed in claim 4, wherein spring biasing means are provided for biasing said other containment disc towards said one containment disc, whereby the fluid pressure exerted on said other containment disc adds to the biasing of said other containment disc when a fluid to be filtered is passed through said filter media, and whereby the fluid pressure exerted on said other containment disc acts so as to at least partially overcome the biasing of said spring biasing means when a backwash fluid is passed through said filter media.

6. Filter apparatus as claimed in claim 1 wherein means are further provided for disconnecting the source of direct current voltage to said sheets in said filter when said backwash fluid is passed through said filter.

* * * * *